(12) United States Patent
Ugactz et al.

(10) Patent No.: US 10,997,955 B2
(45) Date of Patent: May 4, 2021

(54) GUITAR HANGER RACK

(71) Applicants: Paul S Ugactz, New York, NJ (US); Mary E Digan, Toms River, NJ (US)

(72) Inventors: Paul S Ugactz, New York, NJ (US); Mary E Digan, Toms River, NJ (US)

( * ) Notice: Subject to any disclaimer, the term of this patent is extended or adjusted under 35 U.S.C. 154(b) by 187 days.

(21) Appl. No.: 15/690,449

(22) Filed: Aug. 30, 2017

(65) Prior Publication Data

US 2019/0066637 A1 Feb. 28, 2019

(51) Int. Cl.
| | |
|---|---|
| *G10G 5/00* | (2006.01) |
| *F16M 13/02* | (2006.01) |
| *F16M 11/04* | (2006.01) |
| *A47B 81/00* | (2006.01) |
| *F16M 11/28* | (2006.01) |
| *A47F 7/00* | (2006.01) |
| *G01G 7/02* | (2006.01) |

(52) U.S. Cl.
CPC ............. *G10G 5/00* (2013.01); *F16M 13/027* (2013.01); *A47B 81/00* (2013.01); *A47F 7/00* (2013.01); *F16M 11/04* (2013.01); *G01G 7/02* (2013.01)

(58) Field of Classification Search
CPC ........ F16M 13/027; F16M 11/04; G10G 5/00; A47F 7/00; G01G 7/02; A47B 81/00
See application file for complete search history.

(56) References Cited

U.S. PATENT DOCUMENTS

| | | | | |
|---|---|---|---|---|
| 3,872,868 A | * | 3/1975 | Kline | A61J 1/05 128/DIG. 24 |
| 5,375,497 A | * | 12/1994 | Pirchio | G10G 5/00 248/443 |
| D363,959 S | * | 11/1995 | Grubbs | D21/658 |
| 5,590,475 A | * | 1/1997 | Andis | A45D 20/12 34/90 |
| 6,357,713 B1 | * | 3/2002 | BeBow | F16M 13/02 248/300 |
| 6,835,883 B2 | * | 12/2004 | Stevens | F16M 11/22 84/327 |
| 7,395,842 B2 | * | 7/2008 | Dyer | B65B 3/045 141/10 |
| 7,541,529 B1 | * | 6/2009 | Blair | G10G 5/00 224/257 |
| 9,984,667 B2 | * | 5/2018 | Walker | F16M 11/041 |
| 2009/0282963 A1 | * | 11/2009 | Morrow | A47F 7/00 84/290 |

* cited by examiner

*Primary Examiner* — Tan Le
(74) *Attorney, Agent, or Firm* — Wei & Sleman LLP

(57) ABSTRACT

The invention is a guitar hanger rack that comprises a piece of metal (or other rigid material) that is bent and notched at one end and has a curve-shaped cradle at the other bent end. This rack is designed to hold an instrument—such as an electric or acoustic guitar (or other similar type instrument that has a strap button on one end and a neck on the other). The notched end holds the strap button and the other curved cradle end holds the neck of the instrument so that it may be hung from a wall or ceiling. The purpose of the invention is to allow for the display of the instrument at multiple angles and in a manner that will not affect the finish of the instrument.

4 Claims, 4 Drawing Sheets

GUITAR HANGER RACK

BACKGROUND

Field of the Invention

The present invention is directed to allow a user to display a guitar on a wall or ceiling (or other surface). It comprises a metal bar (or other rigid material) measuring about 1.5 inches in width, 19 inches in length and ⅛ inches in thickness. The bar for the guitar rack comprises a bend at both ends—one end has a notch in it and on the other end comprises a more complex hook or cradle. An instrument's neck is placed within this cradle and the instrument's strap button slides into the notch at the other end. The cradle is fitted with an adjustable strap which may be used to add further security to the instrument while in the rack.

A number of patents have been filed previously with respect to guitar hangers by other inventors.

None of the prior art/inventions address the need of the musician who desires: a minimalist approach to hanging a guitar, wants the option to hang their instrument in a variety of positions/angles (including a vertical or horizontal position, or anywhere in between) and that provides proper support to the body while not disturbing the guitar's finish as this one does (as certain materials such as the foam used on certain hangers can react with the finish on instruments).

SUMMARY

The present invention allows the user to hang a guitar (electric or acoustic guitar, or similar instrument) to the wall quickly, easily and without worry, while giving the user a number of angles/options in which to hang it.

Present invention does not require assembly—comprises a single piece that has screw holes for mounting.

DESCRIPTION OF THE RELATED ART

FIG. 1 is a vertical view of said invention. Rotating the view 90 degrees clock-wise, you can see the cradle on the right, and the notched end to the left.

FIG. 2 is a vertical view of said invention showing how it would hold an electric guitar in an upright position. Strap can be seen giving the next extra security to the neck of the instrument.

FIG. 3 is a close-up of the lower portion of the rack and how the strap button slides into said notch.

FIG. 4 shows the invention in the reverse of FIG. 2. as there are left-handed guitars that must be accommodated.

BRIEF DESCRIPTION OF THE DRAWINGS

As you can see in the above drawings (FIG. 1-4), the guitar hanger allows the display of a left or right-handed guitar (or other instrument) on a wall/ceiling or other surface. The invention can also be made in the reverse for the left-handed guitarist, an additional embodiment.

DETAILED DESCRIPTION

Figure 1:
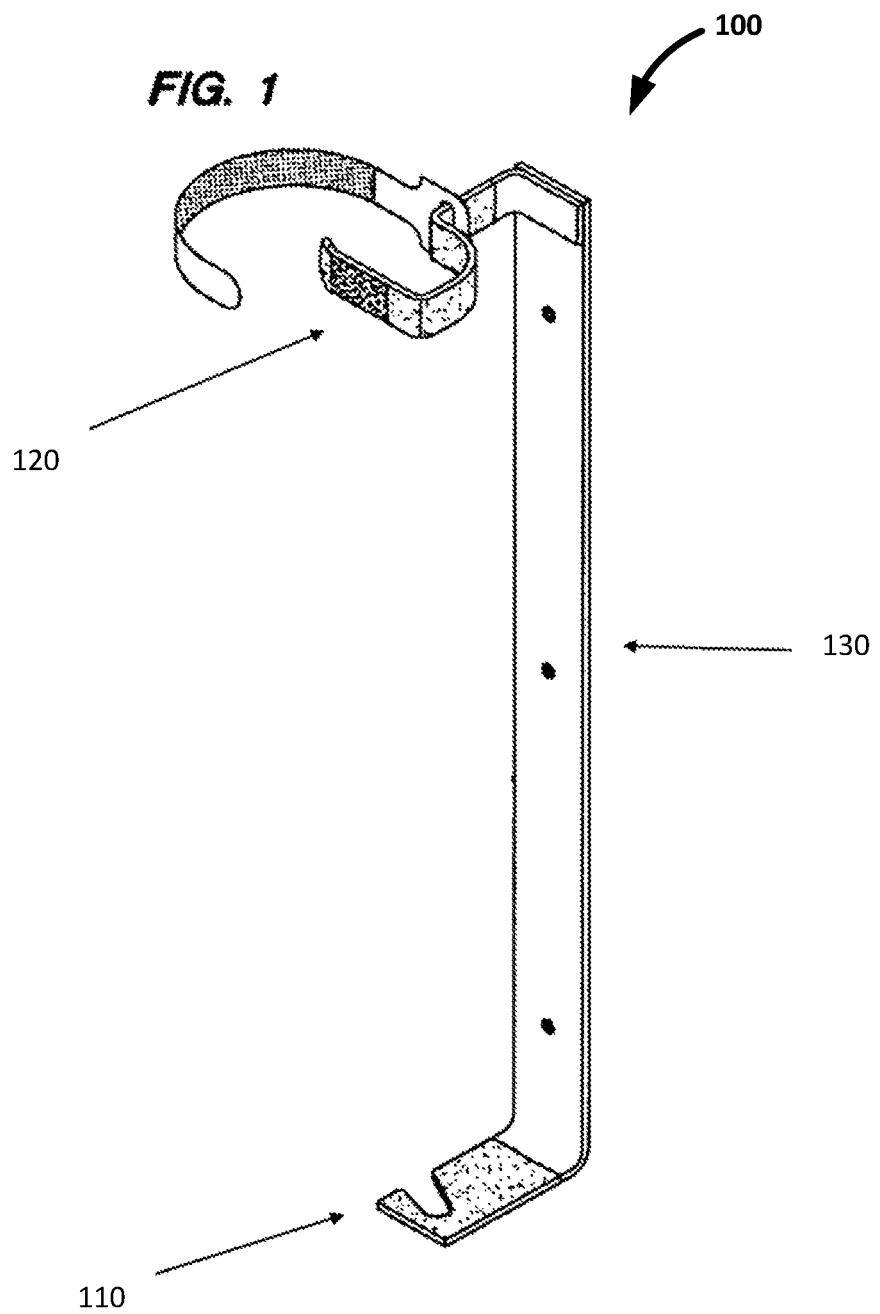
Figure 2:
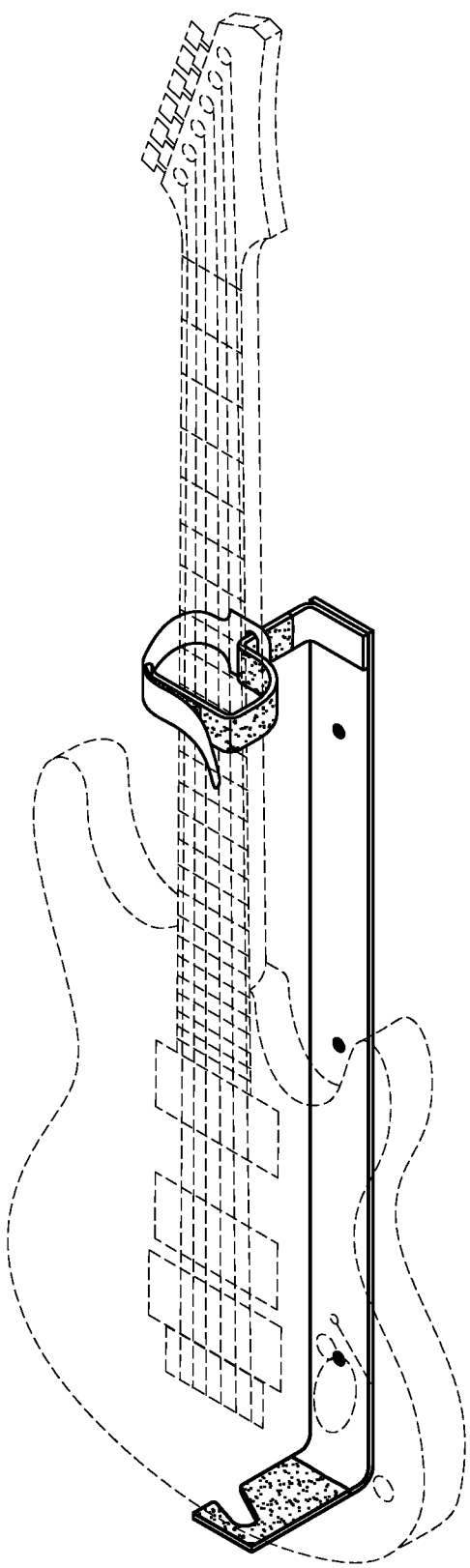
Figure 3:
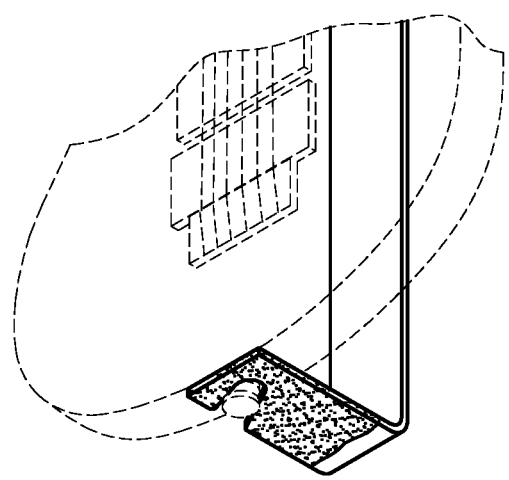
Figure 4:
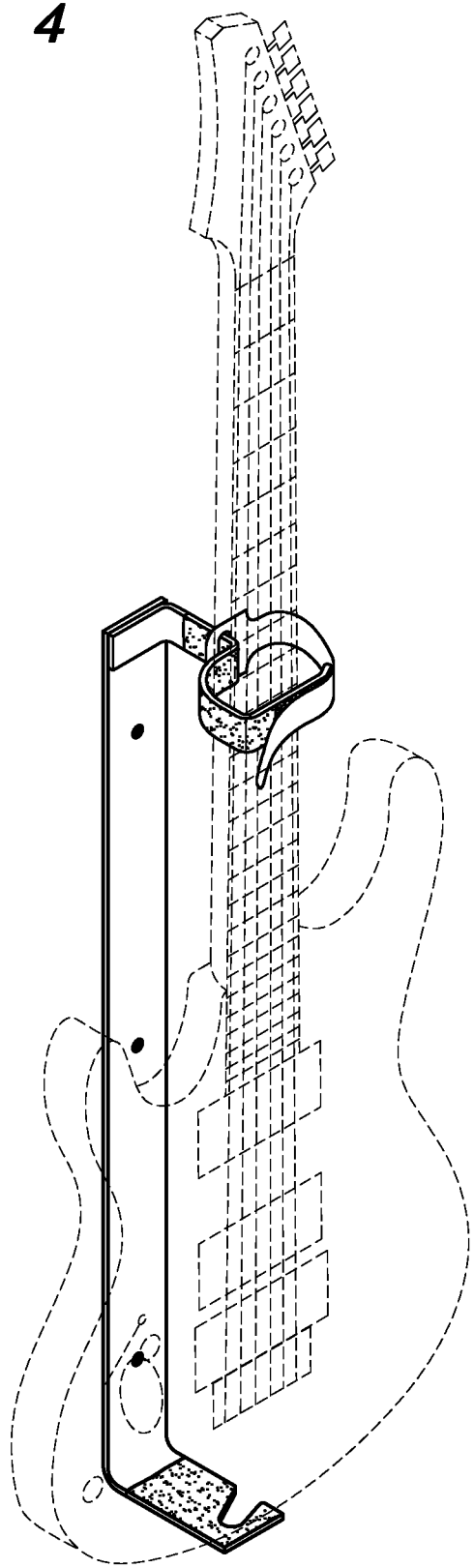

The piece of metal used in the invention comprises a single, flat bar made of aluminum, however, another metal or other substance such as plastic, may be substituted, and still fall within this spec. Additionally, as stated previously the invention comprises a single piece of metal, however, multiple pieces may be joined to create the invention described and this version would also fall within this spec.

A hanger 100 includes multiple portions. The end that cradles the guitar neck (herein referred to as the "cradle") and cradle 120 comprises a curved shape and ends somewhat as a straighter bar 130 which would fall across the fret of the instrument, however, the shape of the cradle 120 may be modified and still fall within this spec.

The notched end 100 comprises a shape loosely resembling that of a curved V or U, however, another shape could be used and it would still fall within this spec.

The length of the bar 130 is long enough to accommodate an electric guitar; however, the length of the invention may be modified to accommodate an acoustic guitar, or another instrument such as a mandolin, violin, etc. and such modification would fall within this spec.

The notched end is on the left and the cradle is on the right in these drawings, however, they could be switched around to accommodate left-handed instruments and this embodiment would also fall within this spec. Further, the notched end and the cradle parts in themselves could be used solely on their own and still fall within this spec.

The invention may be engraved with a marketing name for the invention, or not. Either way, any modification as such would fall within this spec.

The invention depicted holds one instrument, however, the invention may be duplicated and attached to each other with cross-members to comprise a rack system for several instruments to display on a wall or to create a display rack system that stands independently. These embodiments would also fall within this spec.

The strap that secures the guitar is comprised of Velcro (adhesive tape) on said invention; however, the strap may take another form or be fashioned from a different material (including but not limited to elastic, metal, plastic, for example) and any such modifications of said "strap" or securing device would still fall within this spec.

Invention's use is to display a guitar or other instrument that fits into said rack; however, any alternate "new" uses for this invention not mentioned here also fall within this spec.

Invention is designed to adhere to a stationary or mobile surface; however, invention may also be modified or used jointly with other materials to have it stand independently, as in a "tree" formation. Any such embodiment falls within this spec.

The invention comprises a bar that is rubber dipped at both ends; however, the invention may be fully dipped or not dipped at all, or its surface appearance modified (including but not limited to: engraved, buffed/polished, painted, silk screened). Any such modification falls within this spec.

The invention claimed is:

1. An instrument display rack comprising:
    a vertically flattened aluminum bar having an upper end and a lower end, said lower end being bent at an angle perpendicular to the vertical bar defining a base and having a notch at one end of the base;
    a lateral support arm extending from the upper end of the vertical bar, said lateral support arm having a receiving means, said receiving means being formed as a first U or C-shaped cradle at one end, which is attached to one side of the vertical bar and a second U or C-shaped grip at the other end of the receiving means defining an opening through which a neck of the instrument may pass, said U or C-shaped grip having a fastening means attached to the other side of the U or C-shaped grip, said fastening means comprising hooks and/or loop fasteners; and a T-shaped strap having one end defining a slot through which the lateral support arm is inserted and thereby secured to the one end of a T-shaped strap in the first U or C-shaped of the lateral support arm, and another end extending from the slot of the T-shaped strap having fastening means attached to an inner side;

wherein the fastening means of the T-shaped strap comprises hooks and/or loop fasteners, and wherein the hooks and/or loops fasteners of the T-shaped strap removably engage the hooks and/or loops fasteners of the U or C-shaped grip thereby capturing and securing the neck of the instrument.

2. The instrument display rack of claim 1, wherein the first U or C-shaped grip is U-shaped.

3. The instrument display rack of claim 1, wherein the instrument is selected from a guitar, a banjo, a mandolin and a ukulele.

4. The instrument display rack of claim 1, wherein the lateral support arm is metallic.

* * * * *